United States Patent [19]
Yoshida

[11] Patent Number: 5,285,458
[45] Date of Patent: Feb. 8, 1994

[54] SYSTEM FOR SUPPRESSING SPREAD OF ERROR GENERATED IN DIFFERENTIAL CODING

[75] Inventor: Shoji Yoshida, Tochigi, Japan

[73] Assignee: Fujitsu Limited, Kawasaki, Japan

[21] Appl. No.: 672,681

[22] Filed: Mar. 20, 1991

[30] Foreign Application Priority Data

Mar. 20, 1990 [JP] Japan .................................. 2-71223

[51] Int. Cl.$^5$ .............................................. G06F 11/00
[52] U.S. Cl. ...................................... 371/42; 371/47.1; 371/2.1; 375/34
[58] Field of Search ................ 371/42, 47.1, 2.1; 370/105.5; 375/27, 34, 110, 111, 112

[56] References Cited

U.S. PATENT DOCUMENTS

| | | | |
|---|---|---|---|
| 3,336,467 | 8/1967 | Frey, Jr. .................... | 371/42 |
| 3,398,400 | 8/1968 | Rupp et al. ................ | 371/42 |
| 3,471,830 | 10/1969 | McRae et al. ............. | 371/47.1 |
| 3,668,632 | 6/1972 | Oldham, III ............... | 371/42 |
| 4,530,094 | 7/1985 | Sewerinson ................ | 371/43 |
| 4,887,269 | 12/1989 | Cominetti et al. ......... | 371/47.1 |

FOREIGN PATENT DOCUMENTS

| | | |
|---|---|---|
| 6652 | 1/1984 | Japan . |
| 294954 | 12/1986 | Japan . |
| 2216753 | 10/1989 | United Kingdom . |

*Primary Examiner*—Charles E. Atkinson

[57] ABSTRACT

An error suppression system suppresses an error of a data sequence generated in a transmission path between a transmitting terminal and a receiving terminal. The error suppression system includes a data coding circuit in the transmitting terminal for inserting a known bit at a predetermined position of the data sequence and for carrying out a difference logic conversion with respect to the data sequence, a differential coding circuit in the transmitting terminal for carrying out a sum logic conversion with respect to the data sequence which is received from the data coding circuit, a differential decoding circuit in the receiving terminal for carrying out a difference logic conversion with respect to the data sequence received from the differential coding circuit via the transmission path, and a data decoding circuit in the receiving terminal for carrying out a sum logic conversion with respect to the data sequence received from the differential decoding circuit and for restoring the known bit at the predetermined position of the data sequence.

7 Claims, 10 Drawing Sheets

FIG. 3

| | |
|---|---|
| TRANSMISSION DATA | 01☐00101000☐11101101☐0001 |
| OUTPUT OF 71 | 01◉00101000☐11101101①0001 |
| OUTPUT OF 72 | 1,000011000010100100010001 |
| OUTPUT OF 73 | 1100001100001010010010000 |
| RECEIVED DATA SEQUENCE | (NO BIT ERROR) |
| | 1100001100001010010010000 |
| OUTPUT OF 81 | x1100001100001010010010000 |
| OUTPUT OF 82 | x01◉00101000☐11101101①0000 |
| RECEIVED DATA SEQUENCE | (BIT ERROR EXISTS) |
| | 110000◉100①0101①010010◉00 |
| OUTPUT OF 81 | x1100001100101011010010010 |
| OUTPUT OF 82 | x01◉000◎10◎◎☐11◉1101①①◎0 |

FIG.4 PRIOR ART

| OUTPUT OF DEMODULATOR | 1 | 1 | 0 | 1 | 0 | 1 | 0 | 1 | 0 | 1 |
| --- | --- | --- | --- | --- | --- | --- | --- | --- | --- | --- |
| OUTPUT OF 81 | x | 1 | 1 | 0 | 1 | 0 | 1 | 0 | 1 | x |
| OUTPUT OF 82 | x | 1 | 1 | 0 | 1 | 1 | 1 | 1 | x | |

(with markers A, B, C, D on the circled values)

FIG. 6

| | | | |
|---|---|---|---|
| NO BIT ERROR | OUTPUT OF 13 | 1 1 0 0 1 0 1 |
| | RESULT OF SUM LOGIC CONVERSION | 1 0 0 0 1 1 1 |
| | RESULT OF SUM LOGIC CONVERSION OF PREVIOUS BIT | 0 1 0 0 0 1 1 |
| BIT ERROR EXISTS | OUTPUT OF 13 | 1 1 0 0 1 0 1 (A=1, B=①) |
| | RESULT OF SUM LOGIC CONVERSION | 1 0 1 0 1 1 1 |
| | RESULT OF SUM LOGIC CONVERSION OF PREVIOUS BIT | 0 1 0 0 1 1 (C=0, D=①) |

| INPUT DATA SEQUENCE | 11☐010100 11☐11000101☐1110 |
|---|---|
| OUTPUT OF 33 | 11⓪01010011①11000101⓪1110 |
| OUTPUT OF 34 | x11001010011111000101 01110 |
| OUTPUT OF 31 | x01011110100001001111 1001x |
| OUTPUT OF 71 | 0⓪011110 10①001001 11⓪1001 |
| OUTPUT OF 72 | 111010110011100010110001 |
| OUTPUT OF 32 | <u>1</u>11101011001110001 0110001 |
| RECEIVED DATA SEQUENCE | 111101011001110001 0110001 |
| OUTPUT OF 81 | x11110101100111 0001011000 |
| OUTPUT OF 41 | x0⓪011110 10①00100 111⓪1001 |
| OUTPUT OF 43 | 010100110110001011 1110 |
| OUTPUT OF 44 | 010100110110001011 1111 |
| OUTPUT OF 42 | ⓪01010011①11000101⓪111 |

FIG.11

| | |
|---|---|
| OUTPUT OF 32 | 1 1 1 1 0 1 0 1 1 0 0 1 1 1 0 0 0 1 0 1 1 0 0 0 1 |
| RECEIVED DATA SEQUENCE | (NO PHASE INVERSION)<br>A<br>1 1 1 1 ① 1 0 1 ② 0 0 1 1 ② 0 0 0 ② 0 1 1 0 0 0 1 |
| OUTPUT OF 81 | × 1 1 1 1 ① 1 0 1 ② 0 0 1 1 ② 0 0 0 ② 0 1 1 0 0 0 |
| OUTPUT OF 41 | B C<br>× 0 ◻ 0 ② ① 1 1 ① ② 0 ◻ 0 ② ② 0 ② ② 0 ① ◻ 1 0 0 1 |
| OUTPUT OF 43 | 0 0 ② 1 0 1 ① 1 0 1 0 ② 0 0 0 ② 1 1 1 1 0 |
| OUTPUT OF 44 | D E<br>0 ② 0 1 0 ① 1 1 0 1 ② 0 0 0 ② 0 1 1 1 1 1 |
| OUTPUT OF 42 | F G<br>◻ 0 ② 0 1 0 ① 1 1 ◻ 1 ② 0 0 0 ② 0 1 ◻ 1 1 1 |
| RECEIVED DATA SEQUENCE | (PHASE INVERSION EXISTS)<br>A<br>0 0 0 0 ② 0 1 0 ① 1 1 0 0 ① 1 1 1 ① 1 0 0 1 1 1 0 |
| OUTPUT OF 81 | × 0 0 0 0 ② 0 1 0 ① 1 1 0 0 ① 1 1 1 ① 1 0 0 1 1 1 |
| OUTPUT OF 41 | B C<br>× 0 ◻ 0 ② ② 1 1 ① ② 0 ◻ 1 0 ② ② 0 0 0 ② ② 1 ◻ 1 0 0 1 |
| OUTPUT OF 43 | 0 0 ② 1 0 1 ① 1 0 1 0 ② 0 0 0 ② 1 1 1 1 0 |
| OUTPUT OF 44 | D E<br>0 ② 0 1 0 ① 1 1 0 1 ② 0 0 0 ② 0 1 1 1 1 1 |
| OUTPUT OF 42 | F G<br>◻ 0 ② 0 1 0 ① 1 1 ◻ 1 ② 0 0 0 ② 0 1 ◻ 1 1 1 |

SYSTEM FOR SUPPRESSING SPREAD OF ERROR GENERATED IN DIFFERENTIAL CODING

BACKGROUND OF THE INVENTION

The present invention generally relates to error suppression systems, and more particularly to an error suppression system for suppressing a spread of an error generated in differential coding in which a phase of a carrier is relatively shifted depending on each bit of transmission data.

Conventionally, in a digital radio multiplex communication system, no phase information of the carrier is transmitted when transmitting data. For this reason, a receiving terminal may synchronize to one or a plurality of phases. In the case of a 2-phase phase shift keying (PSK), for example, it is uncertain on the receiving terminal end whether the synchronization phase is "0" or "$\pi$".

Accordingly, a differential coding is employed in the digital radio multiplex communication system. According to the differential coding, a transmitting end modulates the transmission data depending on a phase difference of the carrier and a receiving end reproduces the transmission data independently of the absolute phase of the carrier. As a result, even when the synchronization phase is different from the absolute phase of the carrier, the receiving end does not require an operation which is dependent on the synchronization phase such as inverting the polarity and switching the channels.

Figure 1:
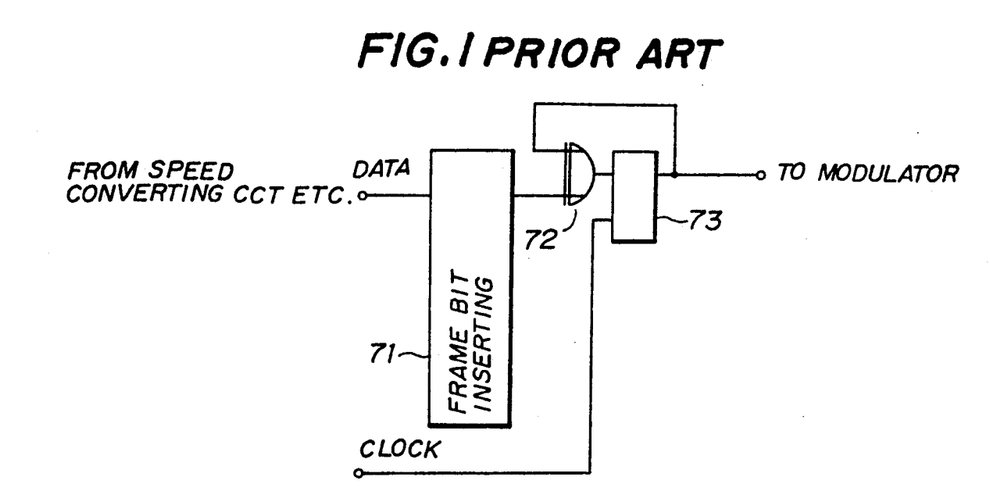
FIG. 1 is a circuit diagram showing an example of a conventional differential coding circuit.
Figure 2:
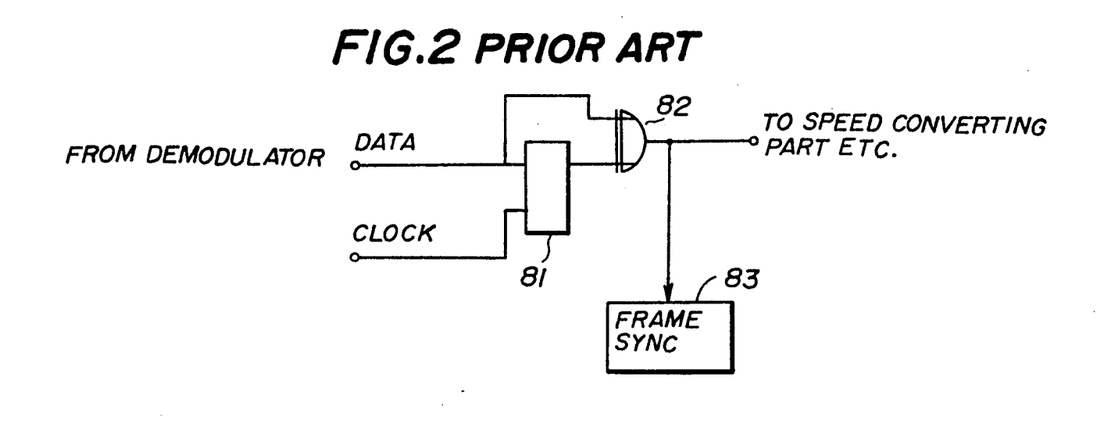
FIG. 2 is a circuit diagram showing an example of a conventional differential decoding circuit.
Figure 3:
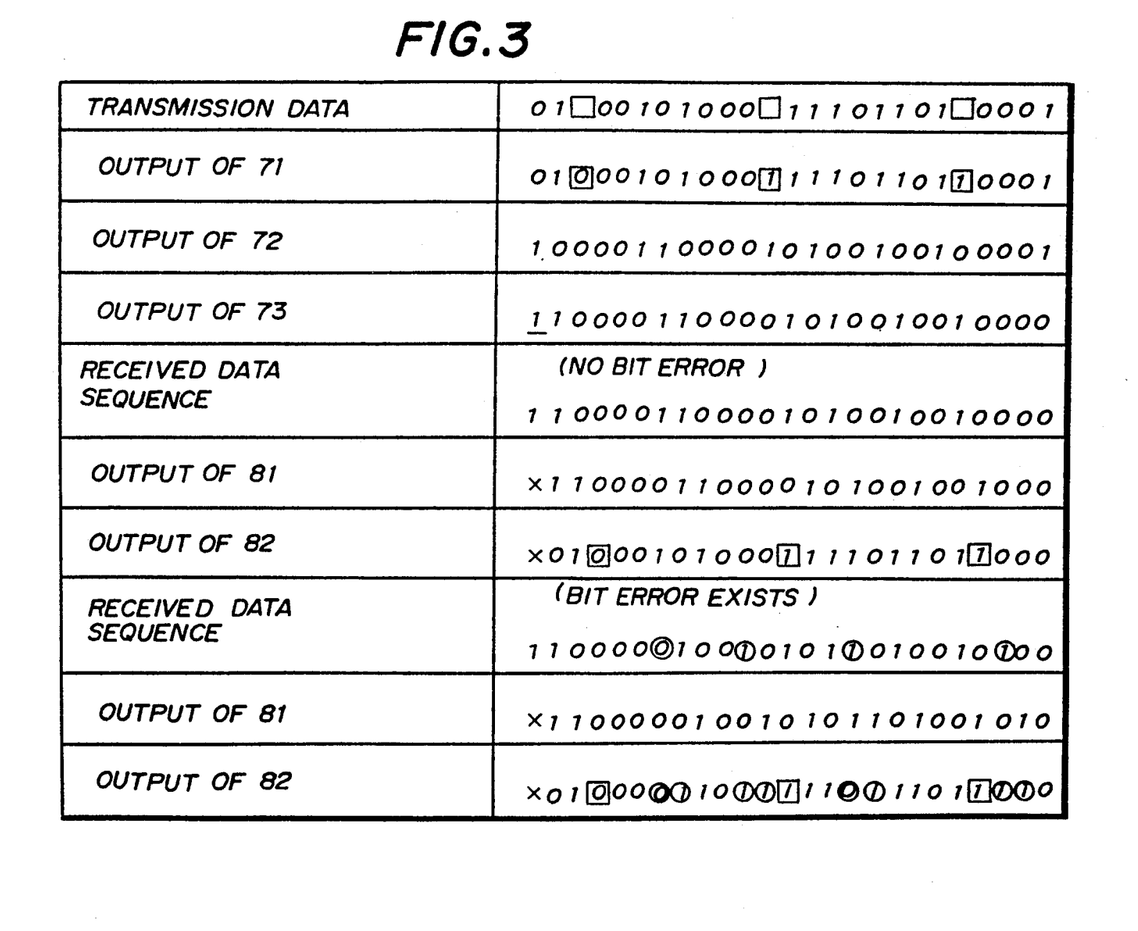
FIG. 3 shows output logic values at various parts of the shown in FIGS. 1 and 2.

A description will be given of a conventional differential coding circuit for the case where the 2-phase PSK is employed. FIG. 1 shows an example of a conventional differential coding circuit, and FIG. 2 shows an example of a conventional differential decoding circuit. FIG. 3 shows output logic values at various parts of the differential coding and decoding circuits shown in FIGS. 1 and 2. In FIG. 3, a rectangular mark indicates a frame bit inserting position and a frame bit, a circular mark indicates an error bit, an underline indicates a presumed value, and a "x" mark indicates an uncertain logic value.

At the transmitting terminal, a frame bit inserting circuit 71 shown in FIG. 1 inserts a predetermined frame bit into the transmission data the speed of which is already converted into a predetermined bit rate. An exclusive-OR gate 72 obtains an exclusive-OR of an output of the frame bit inserting circuit 71 and an output of a flip-flop 73 so as to carry out a sum logic conversion. The output of the flip-flop 73 is supplied to a modulator (not shown) as an output of the differential coding circuit.

At the receiving terminal, an exclusive-OR gate 82 shown in FIG. 2 obtains an exclusive-OR of an output of a flip-flop 81 and consecutive bits output from a demodulator (not shown) so as to carry out a difference logic conversion. In other words, the transmission data is decoded. A frame synchronizing circuit 83 detects the frame bit from the decoded data and carries out a frame synchronization. An output of the exclusive-OR gate 82 is supplied to a speed conversion part or the like.

Figure 4:
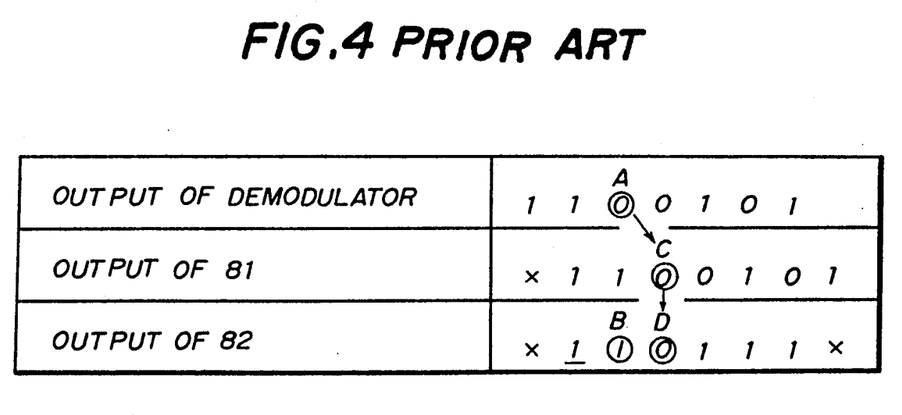
FIG. 4 is a diagram for explaining the spread of bit error.

According to the differential coding using the difference logic, a 1-bit error which is generated in a transmission path spreads to consecutive bits by the decoding. FIG. 4 shows the spread of the bit error. In FIG. 4, the same designations are used as in FIG. 3.

An error bit A is output via the exclusive-OR gate 82 as a bit B having an erroneous logic value and is held as it is in the flip-flop 81. Accordingly, at a timing which is delayed by one bit, a bit C which is held by the flip-flop 81 has an erroneous logic value, and as a result, a bit D which is output from the exclusive-OR gate 82 also has an erroneous logic value.

In addition, in a system which employs an error correction code, it is necessary to add redundant bits to the transmission data. However, there is a limit to the occupied bandwidth, and there is accordingly a limit to the number of redundant bits which may be added. Therefore, although the error inevitably which spreads to the consecutive bits in the differential coding, there is a problem in that it is extremely difficult to correct the error spread in the consecutive bits.

SUMMARY OF THE INVENTION

Accordingly, it is a general object of the present invention to provide a novel and useful error suppression system in which the problem described above is eliminated.

Another and more specific object of the present invention is to provide an error suppression system for suppressing an error of a data sequence generated in a transmission path between a transmitting terminal and a receiving terminal, comprising data coding means in the transmitting terminal for inserting a known bit at a predetermined position of the data sequence and for carrying out a difference logic conversion with respect to the data sequence, differential coding means in the transmitting terminal, coupled to the data coding means, for carrying out a sum logic conversion with respect to the data sequence which is received from the data coding means, differential decoding means in the receiving terminal, coupled to the differential coding means via the transmission path, for carrying out a difference logic conversion with respect to the data sequence received from the differential coding means via the transmission path, and data decoding means in the receiving terminal, coupled to the differential decoding means, for carrying out a sum logic conversion with respect to the data sequence received from the differential decoding means and for restoring the known bit at the predetermined position of the data sequence. According to the error suppression system of the present invention, it is possible to compress the consecutive bit errors caused by a bit error generated in the transmission path to a single bit error without the need to add bits to the data sequence. As a result, it is unnecessary to increase the frequency of the data, and the compression of the consecutive bit errors can be made by use of a relatively simple circuit. Consequently, the effects of the error correction which is dependent on added bits can be improved because there is no need to add bits for the compression of the consecutive bit errors, and it is possible to considerably improve the quality of the transmission in a communication system which employs the differential coding.

Other objects and further features of the present invention will be apparent from the following detailed description when read in conjunction with the accompanying drawings.

DESCRIPTION OF THE PREFERRED EMBODIMENTS

Figure 5:
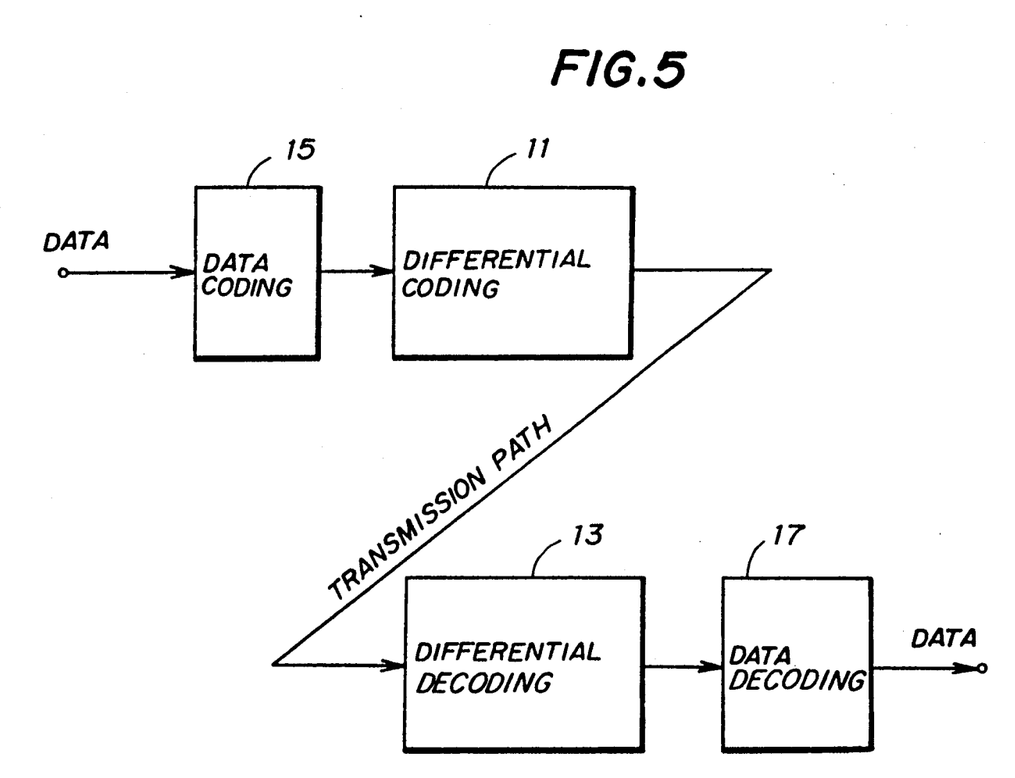
FIG. 5 is a system block diagram for explaining an operating principle of an error suppression system according to the present invention.

First, a description will be given of an operating principle of an error suppression system according to the present invention, by referring to FIG. 5. The differential coding system shown in FIG. 5 uses a differential coding circuit 11 and a data coding means 15 on the transmitting side, and a differential decoding circuit 13 and a data decoding means 17 on the receiving side. A transmission data sequence from the transmitting side is transmitted to the receiving side via a transmission path, and a synchronous detection is made by absorbing the change of the carrier phase in the transmission path.

The data coding means 15 inserts a known bit at a predetermined position of the transmission data sequence, and carries out a difference logic conversion. An output of the data coding means 15 is supplied to the differential coding circuit 11. The differential coding circuit 11 carries out a sum logic conversion with respect to the output of the data coding means 15 and supplies a data sequence to the transmission path.

The differential decoding circuit 13 carries out a difference logic conversion with respect to the data sequence which is received via the transmission path, and supplies a data sequence to the data decoding means 17. The data decoding means 17 carries out a sum logic conversion with respect to the output data sequence of the differential decoding circuit 13, and restores the known bit at the predetermined position by carrying out a frame synchronization.

In other words, the data decoding means 17 carries out the sum logic conversion with respect to the output data sequence of the differential decoding circuit 13, so as to compress the consecutive bit errors corresponding to the bit error generated in the transmission path into a single bit error.

Figure 6:
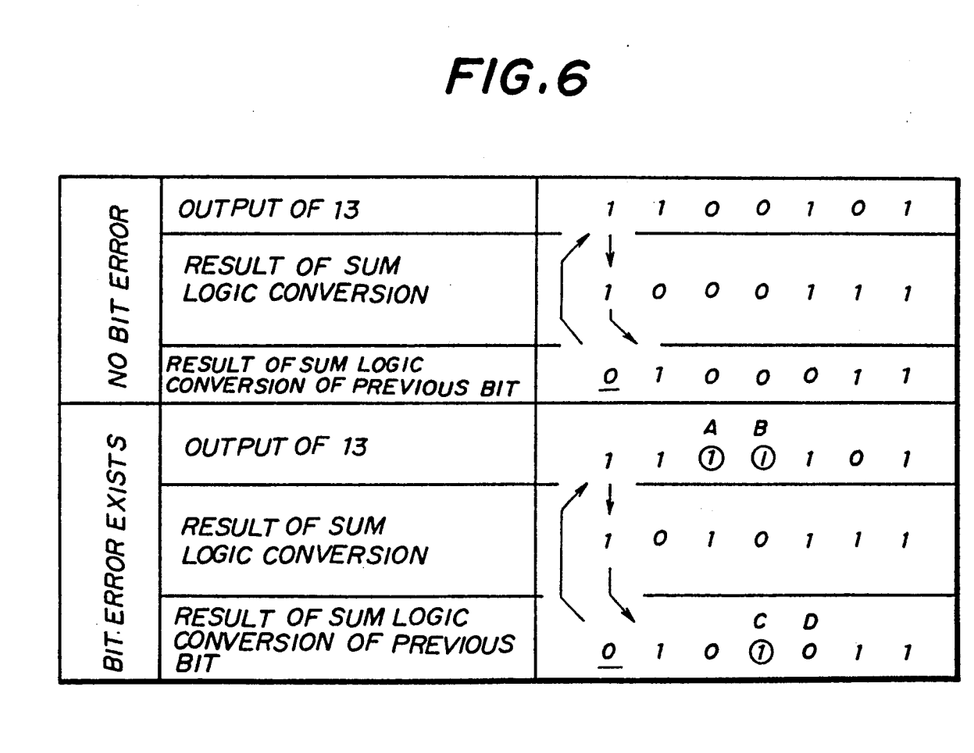
FIG. 6 is a diagram for explaining compression of consecutive bit errors into a single bit error.

FIG. 6 is a diagram for explaining the compression of the consecutive bit errors into the single bit error. In FIG. 6, the same designations are used as in FIGS. 3 and 4.

The data coding means 15 inserts the known bit, that is, a known frame bit, for example, into the transmission data sequence and defines all bits of the transmission data sequence. In addition, the data coding means 15 subjects the transmission data sequence to the difference logic conversion before supplying the same to the differential coding circuit 11.

When the differential decoding circuit 13 outputs bits A and B which have erroneous logic values corresponding to the bit error generated in the transmission path, the data decoding circuit 17 carries out the sum logic conversion so as to compress the erroneous bits A and B into a single erroneous bit C, so that the decoded data sequence matches the transmission data sequence.

Figure 7:
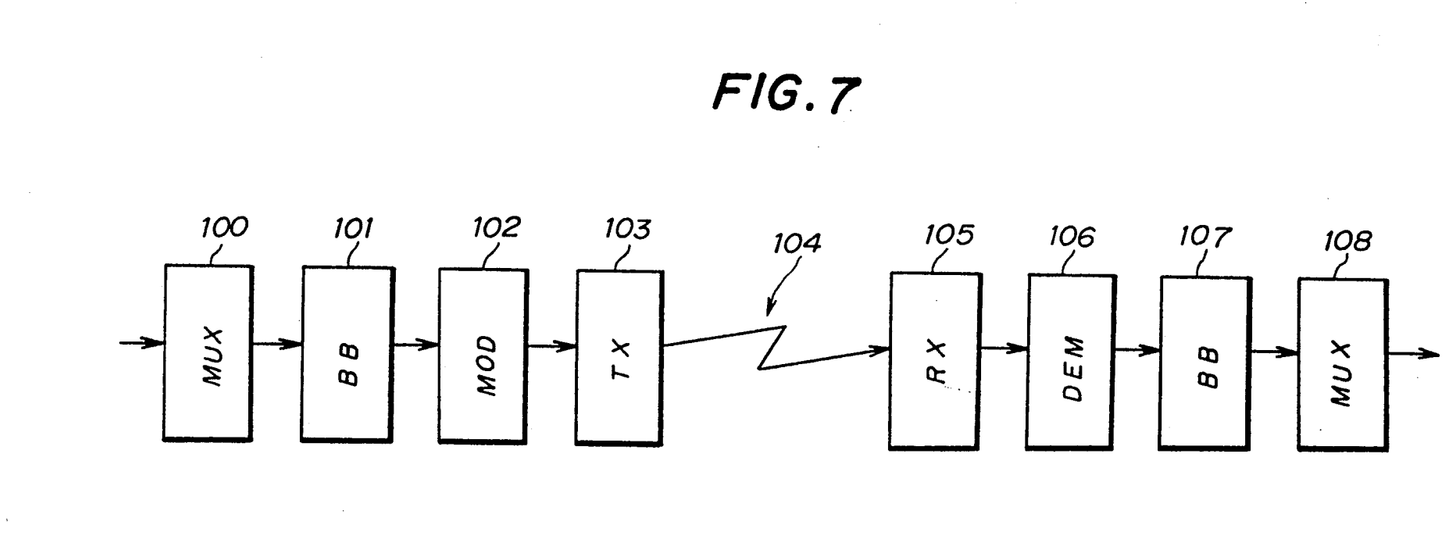
FIG. 7 is a system block diagram generally showing a system to which the present invention may be applied.

FIG. 7 generally shows a system to which the error suppression system according to the present invention may be applied. The system shown in FIG. 7 includes a switching system 100, a digital signal processing part 101 which carries out a baseband processing, a modulator 102, a transmitting part 103, a receiving part 105 which is coupled to the transmitting part 103 via a transmission path 104, a demodulator 106, a digital signal processing part 107 which carries out a baseband processing, and a switching system 108 which are connected as shown. The transmission data from the transmitting part 103 is transmitted to the receiving part 105 by radio communication. The error suppression system according to the present invention is applied to the digital signal processing parts 101 and 107.

Figure 8:
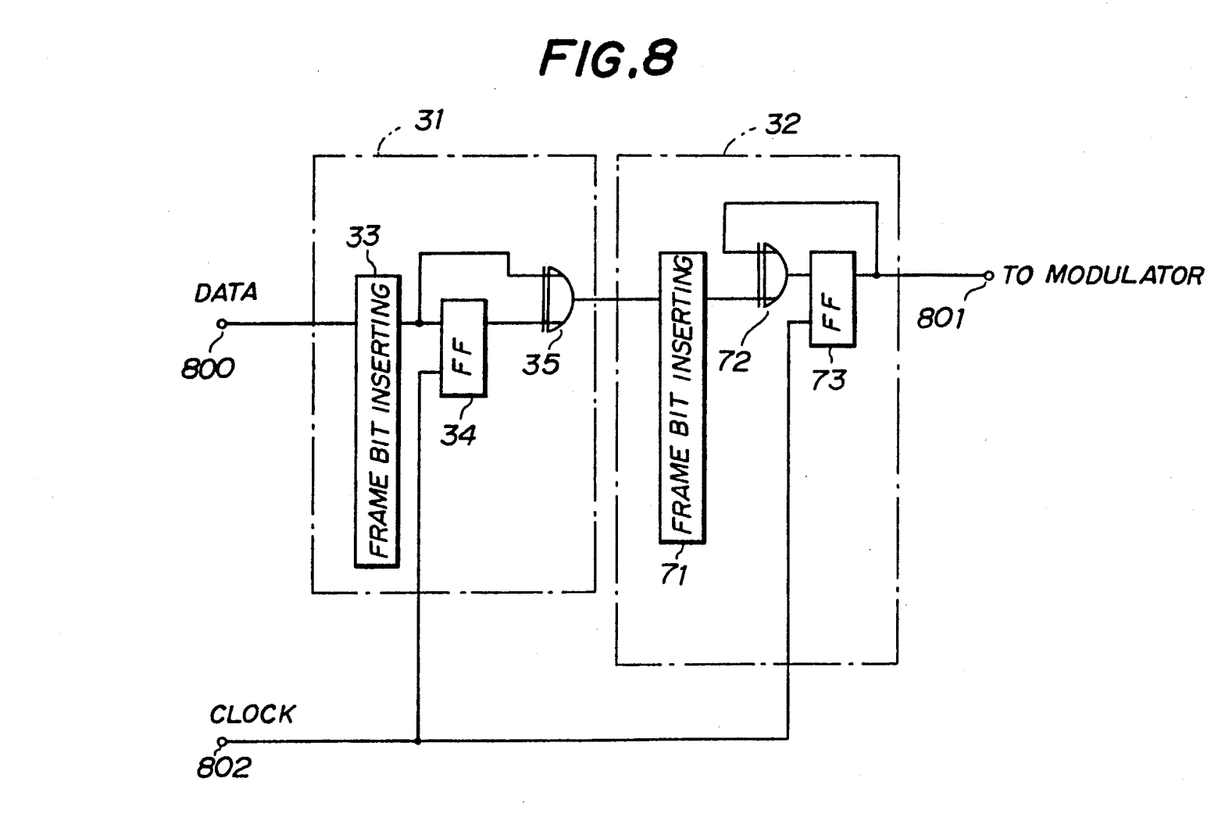
FIG. 8 is a circuit diagram showing a transmitting terminal used in an embodiment of the error suppression system according to the present invention.
Figure 9:
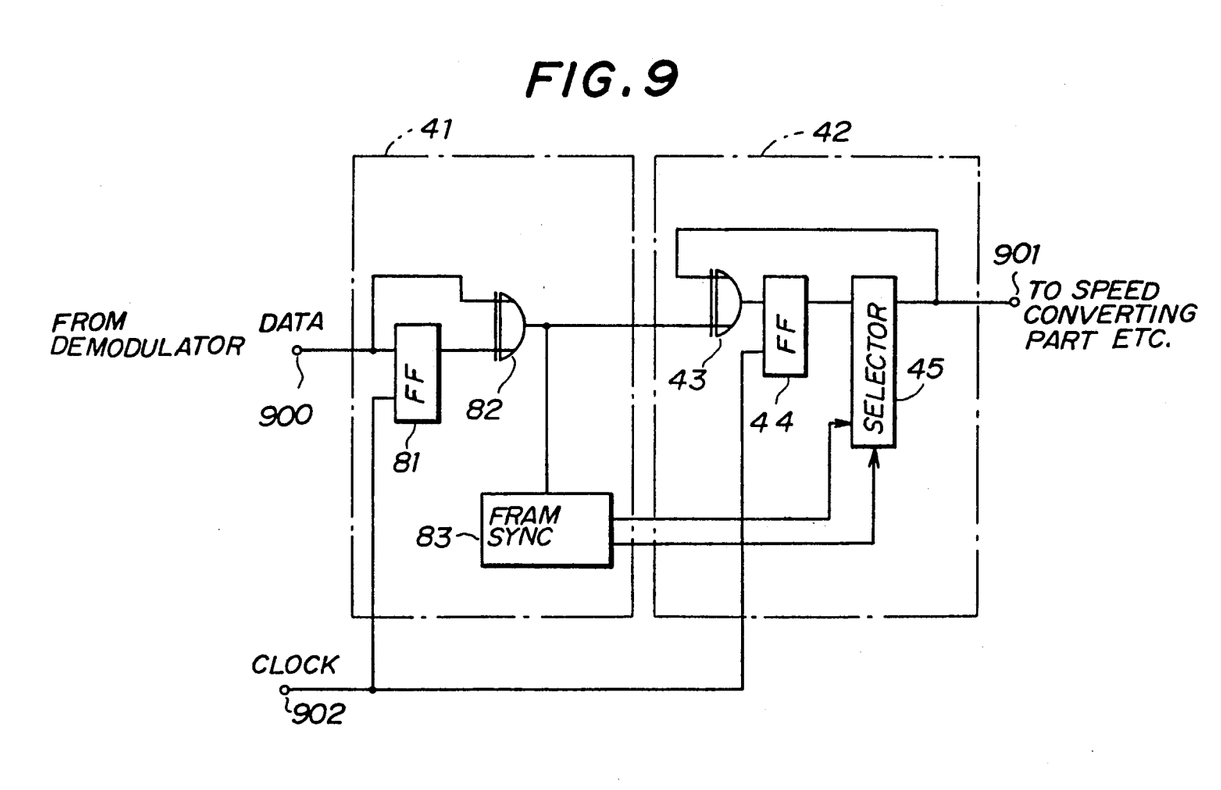
FIG. 9 is a circuit diagram showing a receiving terminal used in the embodiment of the error suppression system according to the present invention.

Next, a description will be given of an embodiment of the error suppression system according to the present invention. FIG. 8 shows the structure of a transmitting terminal employed in this embodiment, and FIG. 9 shows the structure of a receiving terminal employed in this embodiment. In FIGS. 8 and 9, those parts which are the same as those corresponding parts in FIGS. 1 and 2 are designated by the same reference numerals, and a description thereof will be omitted.

In FIG. 8, the transmission data from a terminal 800 is passed through a data coding circuit 31 and a differential coding circuit 32 and is supplied to a modulator (not shown) via a terminal 801. In the data coding circuit 31, the transmission data from the terminal 800 is supplied to a frame bit inserting circuit 33. An output of the frame bit inserting circuit 33 is supplied to a flip-flop 34 on one hand and supplied to one input terminal of an exclusive-OR gate 35 on the other. An output of the flip-flop 34 is supplied to the other input terminal of the exclusive-OR gate 35, and an output of the exclusive-OR gate 35 is supplied to the differential coding circuit 32. The structure of the differential coding circuit 32 is the same as that of the differential coding circuit shown in FIG. 1. A clock signal from a terminal 802 is applied to the flip-flop 34 of the data coding circuit 31 and to the flip-flop 73 of the differential coding circuit 32.

In FIG. 9, a data from a demodulator (not shown) is received at a terminal 900. This data is passed through a differential decoding circuit 41 and a data decoding circuit 42 and is supplied to a speed converting part (not shown) or the like via a terminal 901. The structure of the differential decoding circuit 41 is the same as that of the differential decoding circuit shown in FIG. 2. In the data decoding circuit 42, the output of the differential decoding circuit 41 is supplied to one input terminal of an exclusive-OR gate 43, and an output of the exclusive-OR gate 43 is supplied to a flip-flop 44. An output of the flip-flop 44 is passed through a selector circuit 45 and is output from the terminal 901 as the output of the data decoding circuit 42. The output of the flip-flop 44 is also supplied to the other input terminal of the exclusive-OR gate 43. The frame synchronizing circuit 83 of the differential decoding circuit 41 supplies to the selector circuit 45 a bit sequence corresponding to the frame pattern and a switching timing signal. A clock signal from a terminal 902 is applied to the flip-flop 81 of the differential decoding circuit 41 and to the flip-flop 44 of the data decoding circuit 42.

Figure 10:
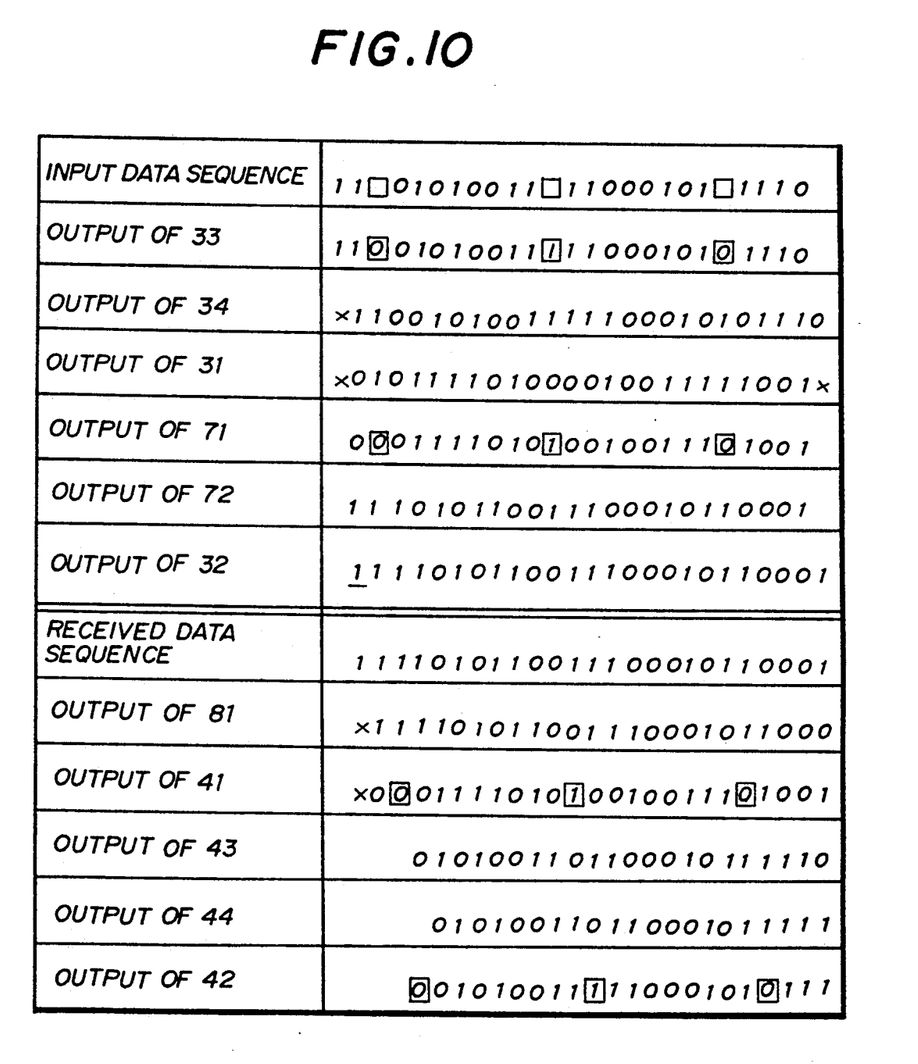
FIG. 10 is a diagram showing output logic values at various parts of the circuits shown in FIGS. 8 and 9 when no bit error exists.
Figure 11:
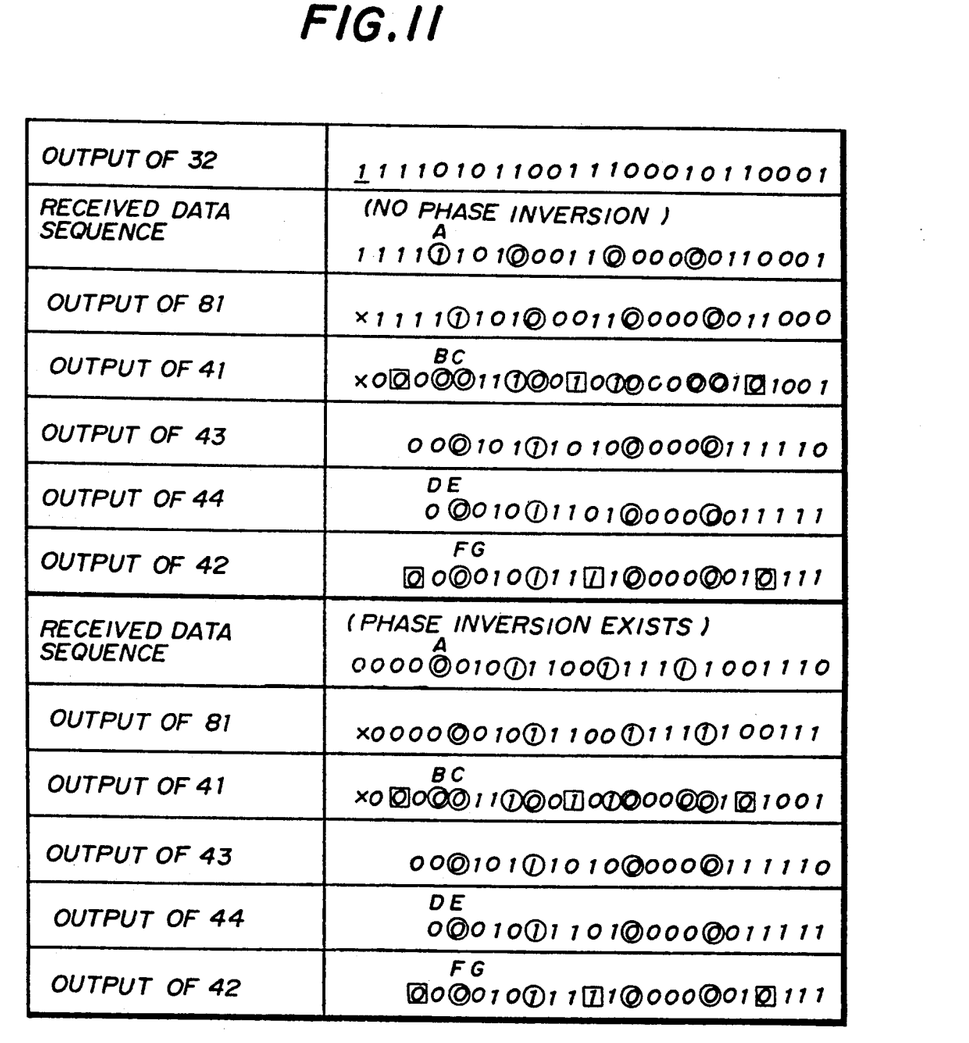
FIG. 11 is a diagram showing output logic values at various parts of the circuits shown in FIGS. 8 and 9 when a bit error exists.

FIG. 10 shows the output logic values at various parts of the circuits shown in FIGS. 8 and 9 when no bit error exists, and FIG. 11 shows the output logic values at various parts of the circuits shown in FIGS. 8 and 9 when a bit error exists. In FIGS. 10 and 11, the same designations are used as in FIGS. 3, 4 and 6. In addition, in FIG. 11, the output logic values at the various parts of the differential coding circuit 32 are the same as those of the differential coding circuit 32 shown in FIG. 10.

Next, a description will be given of the operations of the transmitting and receiving terminals.

In the transmitting terminal, the frame bit inserting circuit 33 of the data coding circuit 31 carries out the predetermined speed conversion with respect to the transmission data and inserts the predetermined bit sequence in place of undefined frame bits, so as to enable differential coding of the transmission data. In addition, the flip-flop 34 and the exclusive-OR gate 35 carry out the difference logic conversion with respect to the bit sequence which is obtained from the frame bit inserting circuit 33. The output of the data coding circuit 31 is subjected to the predetermined coding in the differential coding circuit 32 and is transmitted to the transmission path via the modulator (not shown).

In the receiving terminal, the differential decoding circuit 41 carries out the difference logic conversion with respect to the data which is received from the demodulator (not shown) and thereafter supplies the data to the data decoding circuit 42. The data decoding circuit 42 carries out a sum logic conversion complementary to the difference logic conversion carried out in the differential decoding circuit 41. As a result, the consecutive bit errors which correspond to the bit error generated in the transmission path are compressed to a single bit error.

For example, when there is no phase inversion shown in FIG. 11, an error is generated in the logic value of a bit A of the received data sequence from the demodulator (not shown) in correspondence with the bit error generated in the transmission path. For this reason, the logic values of bits B and C both become erroneous at the output of the differential decoding circuit 41 in correspondence with the bit A which has the erroneous logic value. In the data decoding circuit 42, the exclusive-OR gate 43 carries out the sum logic conversion based on the bit B and a bit D which is obtained from the flip-flop 44 and has the correct logic value, and thus, a bit E having the erroneous logic value is output from the data decoding circuit 42. However, when the difference logic conversion is carried out with respect to the next bit C, a bit G having the correct logic value is obtained because the bit E (bit F) held in the flip-flop 44 also has the erroneous logic value. Therefore, the consecutive bit errors are compressed to a single bit error.

Furthermore, the data decoding circuit 42 carries out the sum logic conversion complementary to the difference logic conversion carried out in the data coding circuit 31 of the transmitting terminal so as to restore the transmission data.

According to this embodiment, the consecutive bit errors which correspond to the bit error generated in the transmission path can be compressed to a single bit error, even when the logic value of the data output from the demodulator (not shown) is inverted due to the different synchronization phase.

In addition, when the power source is turned ON, the selector circuit 45 selects the output of the flip-flop 44 or the known frame bit from the frame synchronizing circuit 83 depending on the switching timing signal from the frame synchronizing circuit 83, so as to eliminate the uncertainty of the output logic value of the flip-flop 44 caused by the synchronization phase and the like.

Furthermore, this embodiment is especially effective in that no additional bits are inserted into the transmission data sequence, because the frame bit is inserted into the transmission data sequence as the known bit.

Further, the present invention is not limited to these embodiments, but various variations may be made without departing from the scope of the present invention.

What is claimed is:

1. An error suppression system for suppressing an error of a data sequence generated in a transmission path between a transmitting terminal and a receiving terminal, said error suppression system comprising:
   data coding means in the transmitting terminal for inserting a known bit at a predetermined positioned of the data sequence and for carrying out a difference logic conversion with respect to the data sequence;
   differential coding means in the transmitting terminal, coupled to said data coding means, for carrying out a sum logic conversion with respect to the data sequence which is received from said data coding means;
   differential decoding means in the receiving terminal, coupled to said differential coding means via the transmission path, for carrying out a difference logic conversion with respect to the data sequence received from said differential coding means via the transmission path; and
   data decoding means in the receiving terminal, coupled to said differential decoding means, for carrying out a sum logic conversion with respect to the data sequence received from said differential decoding means and for restoring the known bit at the predetermined position of the data sequence and wherein said differential decoding means includes a first frame bit inserting circuit for inserting a frame bit into the data sequence which is received from said data coding means, and a first circuit for carrying out the sum logic conversation with respect to the data sequence output from said frame bit inserting circuit, and said differential decoding means includes a second circuit for carrying out the difference logic conversion with respect to data sequence received from the transmission path, and a frame synchronizing circuit for carrying out a frame synchronization by detecting the frame bit inserted in the data sequence received from said second circuit.

2. The error suppression system as claimed in claim 1, wherein said data coding means includes a second frame bit inserting circuit for inserting the known bit at the predetermined position of the data sequence, and a third circuit for carrying out the difference logic conversion with respect to the data sequence including the known bit, and said data decoding means includes a fourth circuit for carrying out the sum logic conversion with respect to the data sequence received from said differential decoding means, and a selector circuit for restoring the known bit at the predetermined position of the data sequence in frame synchronism in response to a timing signal from said frame synchronizing circuit of said differential decoding means by selectively outputting one of an output of said fourth circuit and the known bit in response to the timing signal.

3. The error suppression system as claimed in claim 2, wherein said first circuit includes a first exclusive-OR circuit which receives an output of said frame bit inserting circuit, and a first flip-flop which receives an output of said first exclusive-OR circuit and supplies an output to said first exclusive-OR circuit, said first flip-flop supplying the output thereof to the transmission path as an output of said differential coding means, and said second circuit includes a second flip-flop which receives the data sequence from the transmission path, and a second exclusive-OR circuit which receives an output of said second flip-flop and the data sequence from the transmission path and supplies an output to said data decoding means, said frame synchronizing circuit detecting a frame synchronization from the output of said second exclusive-OR circuit.

4. The error suppression system as claimed in claim 3, wherein said third circuit includes a third flip-flop which receives an output of said known bit inserting circuit, and a third exclusive-OR circuit which receives an output of said third flip-flop and the output of said known bit inserting circuit and supplies an output to said differential coding means, and said fourth circuit includes a fourth exclusive-OR circuit which receives the output of said differential decoding means and the output of said selector circuit, and a fourth flip-flop which receives an output of said fourth exclusive-OR circuit and supplies an output to said selector circuit.

5. The error suppression system as claimed in claim 4, wherein said known bit inserting circuit inserts a known frame bit, and said frame synchronizing circuit supplies to said selector circuit a bit sequence corresponding to a frame pattern.

6. The error suppression system as claimed in claim 1, wherein said known bit is a known frame bit.

7. The error suppression system as claimed in claim 1, wherein said data decoding means carries out the sum logic conversion which is complementary to the difference logic conversion carried out by said differential decoding means, so that consecutive bit errors caused by a bit error generated in the transmission path are compressed to a single bit error.

* * * * *